United States Patent
Williams et al.

(10) Patent No.: US 10,295,770 B2
(45) Date of Patent: *May 21, 2019

(54) MAGNETIC CHARGING AND OPTICAL DATA TRANSFER SYSTEM

(71) Applicant: Apple Inc., Cupertino, CA (US)

(72) Inventors: Alexander W. Williams, Santa Clara, CA (US); Nicholas G. Merz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,057

(22) Filed: Apr. 25, 2018

(65) Prior Publication Data

US 2018/0239097 A1 Aug. 23, 2018

Related U.S. Application Data

(63) Continuation of application No. 15/273,624, filed on Sep. 22, 2016, now Pat. No. 9,977,205.
(Continued)

(51) Int. Cl.
*G02B 6/42* (2006.01)
*H02J 50/80* (2016.01)
(Continued)

(52) U.S. Cl.
CPC ......... *G02B 6/4293* (2013.01); *G02B 6/3886* (2013.01); *G02B 6/4277* (2013.01);
(Continued)

(58) Field of Classification Search
CPC ..... H04B 10/114; H04B 5/0037; H04J 7/025; H04J 50/10; H04J 50/80; H04J 50/90;
(Continued)

(56) References Cited

U.S. PATENT DOCUMENTS 9,977,205 B2 * 5/2018 Williams ............... H02J 50/10
2004/0208596 A1 10/2004 Bringans et al.
(Continued)

FOREIGN PATENT DOCUMENTS

WO 2017058548 A1 4/2017

OTHER PUBLICATIONS

Non-Final Office Action in U.S. Appl. No. 15/273,624, dated Aug. 22, 2017 in 11 pages (of-record in parent application).
(Continued)

*Primary Examiner* — Dalzid E Singh
(74) *Attorney, Agent, or Firm* — Kilpatrick Townsend and Stockton, LLP

(57) ABSTRACT

Embodiments describe an apparatus for magnetic charging and optical data transferring. The apparatus includes an inductive transmitting coil disposed within a housing, an optically transparent window disposed at a surface of the housing and above the inductive transmitting coil, and a first optical data transfer module disposed within the housing below the optically transparent window. The first optical data transfer module may be to perform at least one of emitting optical signals through the optically transparent window or detecting optical signals passing through the optically transparent window.

14 Claims, 2 Drawing Sheets

Related U.S. Application Data

(60) Provisional application No. 62/235,070, filed on Sep. 30, 2015.

(51) Int. Cl.
| | | |
|---|---|---|
| *H02J 50/90* | (2016.01) | |
| *G02B 6/36* | (2006.01) | |
| *H02J 7/02* | (2016.01) | |
| *H04B 5/00* | (2006.01) | |
| *H04B 10/114* | (2013.01) | |
| *H02J 50/10* | (2016.01) | |
| *G02B 6/38* | (2006.01) | |

(52) U.S. Cl.
CPC .............. *H02J 7/025* (2013.01); *H02J 50/10* (2016.02); *H02J 50/80* (2016.02); *H02J 50/90* (2016.02); *H04B 5/0037* (2013.01); *H04B 10/114* (2013.01)

(58) Field of Classification Search
CPC ... G02B 6/3886; G02B 6/4277; G02B 6/4293
USPC ........................................................ 398/131
See application file for complete search history.

(56) References Cited

U.S. PATENT DOCUMENTS

| | | | |
|---|---|---|---|
| 2006/0184705 A1* | 8/2006 | Nakajima | H02J 7/0004 710/303 |
| 2007/0035917 A1 | 2/2007 | Hotelling et al. | |
| 2010/0181841 A1 | 7/2010 | Azancot et al. | |
| 2011/0018356 A1* | 1/2011 | Chatterjee | H02J 5/005 307/104 |
| 2011/0050164 A1 | 3/2011 | Partovi et al. | |
| 2012/0212178 A1* | 8/2012 | Kim | H02J 50/10 320/108 |
| 2013/0320471 A1 | 12/2013 | Luan | |
| 2014/0008997 A1 | 1/2014 | Azancot et al. | |
| 2014/0323804 A1 | 10/2014 | Wilson et al. | |
| 2015/0380454 A1 | 12/2015 | Luan | |
| 2016/0132457 A1* | 5/2016 | Castell | G06F 13/4247 710/106 |
| 2017/0090134 A1 | 3/2017 | Williams et al. | |
| 2017/0215239 A1 | 7/2017 | Deng et al. | |

OTHER PUBLICATIONS

Notice of Allowance in U.S. Appl. No. 15/273,624, dated Jan. 22, 2018 in 5 pages (of-record in parent application).

International Preliminary Report on Patentability in International Application No. PCT/US2016/052445, dated Apr. 12, 2018 in 7 (of-record in parent application).

International Search Report and Written Opinion in International Application No. PCT/US2016/052445, dated Dec. 19, 2016 in 10 pages (of-record in parent application).

Office Action in Taiwan Application No. TW105129956, dated Sep. 26, 2017 in 5 pages (of-record in parent application).

\* cited by examiner

MAGNETIC CHARGING AND OPTICAL DATA TRANSFER SYSTEM

CROSS-REFERENCES TO RELATED APPLICATIONS

This application is a continuation of U.S. patent application Ser. No. 15/273,624, filed on Sep. 22, 2016, and entitled "Magnetic Charging and Optical Data Transfer System," which claims priority to U.S. Provisional Patent Application No. 62/235,070, filed on Sep. 30, 2015, and entitled "Magnetic Charging and Optical Data Transfer System," the disclosures of which are hereby incorporated by reference in their entirety for all purposes.

BACKGROUND

Modern mobile devices, such as smart phones, smart watches, tablets, and the like, operate when sufficient charge is stored in their batteries. Currently, a single cable connection can be used to both charge the mobile device and allow for data transfer between the mobile device and a charger. Some modern mobile devices can charge their batteries via wireless charging. However, there is no effective way to utilize a single point of exchange system to wireless transfer both power and data to a device from a separate computer or other data source. Thus, improvements in integrated data transfer and wireless charging methods are desired.

SUMMARY

Embodiments provide systems, methods, and devices that can achieve both wireless charging and data transferring for electronic devices.

In some embodiments, an apparatus includes an inductive transmitting coil disposed within a housing, an optically transparent window disposed at a surface of the housing and above the inductive transmitting coil, a first optical data transfer module disposed within the housing below the optically transparent window. The first optical data transfer module may be to perform at least one of emitting optical signals through the optically transparent window or detecting optical signals passing through the optically transparent window.

The first optical data transfer module may be further configured to automatically align with a second optical data transfer disposed outside of the housing by moving in a horizontal plane. The second optical data transfer may be configured to automatically align with the first optical data transfer module by moving in a horizontal plane. The apparatus may further include alignment magnets laterally disposed around the optically transparent window. In certain embodiments, the optically transparent window is formed of a selectively transmissive material that is selectively transparent to at least one of infrared or ultraviolet light. The optically transparent window may include a selectively transmissive coating, where the selectively transmissive coating is selectively transparent to at least one of infrared or ultraviolet light. In some embodiments, the apparatus may further include a magnetic shielding disposed around the first optical data transfer module.

A better understanding of the nature and advantages of embodiments of the present disclosure may be gained with reference to the following detailed description and the accompanying drawings.

DETAILED DESCRIPTION

Figure 1:
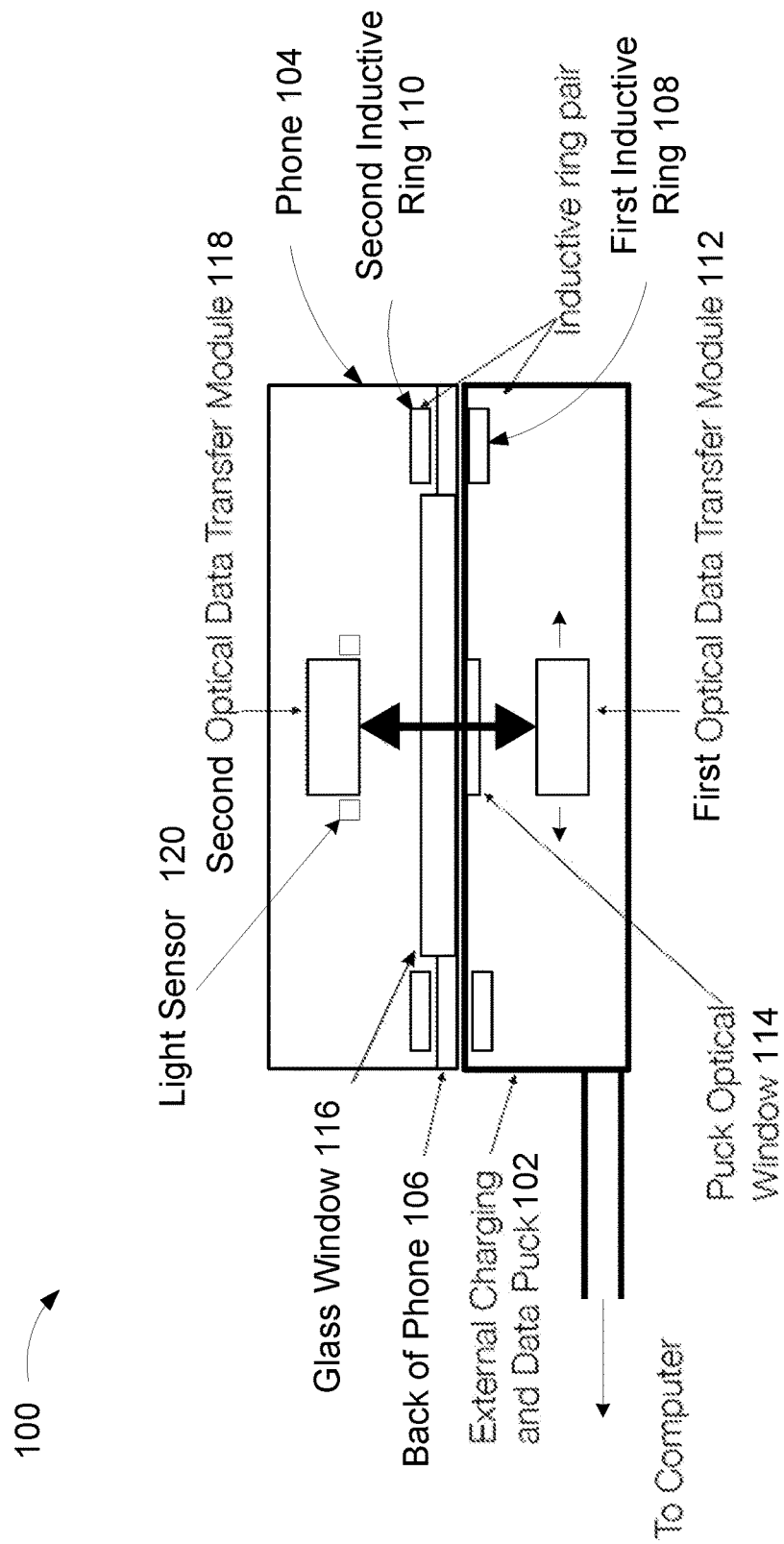
FIG. 1 illustrates an exemplary charging and data transfer system, according to certain embodiments of the present disclosure.

FIG. 1 illustrates an exemplary charging and data transfer system 100 in accordance with embodiments of the present disclosure. Charging and data transfer system 100 may include an external charging and data puck 102 and a phone 104. As shown, external charging and data puck 102 is below phone 104 such that a back of the phone 106 is touching or very close to external charging and data puck 102. External charging and data puck 102 may be connected to a computer (not shown) that receives and/or transmits data through external charging and data puck 102. The computer may also provide power to phone 104 through external charging and data puck 102. In embodiments, external charging and data puck 102 can instead be directly connected to a power outlet (e.g., a wall outlet). Although a phone is illustrated as coupled to external charging and data puck 102, one skilled in the art understands that any suitable electronic device may be coupled to external charging and data puck 102.

In embodiments, external charging and data puck 102 includes a first inductive ring 108 for providing power to electronic devices. First inductive ring 108 may be a transmitting coil for wireless charging. As an example, first inductive ring 108 may be a transmitting coil that can generate time-varying magnetic fields. The generated time-varying magnetic fields may induce a corresponding current in a second inductive ring 110. Second inductive ring 110 may be a receiving coil for wireless charging. Second inductive ring 110 may be disposed in a receiving device, such as phone 104 shown in FIG. 1. In embodiments, either one of the first or second inductive ring may be used for transmitting and receiving. The first and second inductive rings are shown as an inductive ring pair.

For transmitting data, external charging and data puck 102 may include a first optical data transfer module 112 and a puck optical window 114. First optical data transfer module 112 may be configured to emit and/or detect optical signals, such as light emitted at various frequencies, for sending and/or receiving data to electronic devices, such as phone 104. In embodiments, first optical data transfer module 112 may be configured to emit and/or detect columnated light, focusing light, or dispersing light. The light may exit from and enter into external charging and data puck 102 through puck optical window 114.

In embodiments, puck optical window 114 is transparent to the emitted light such that puck optical window 114 does not adversely affect the intensity of the emitted light. For instance, puck optical window 114 may be formed of a selectively transmissive material. The selectively transmissive material may be reflective of light in certain wavelengths while transparent to light in other wavelengths. As an example, the selectively transmissive material may be reflective of visual light and transparent to infrared (IR) and/or ultraviolet (UV) light. Thus, a user would not be able to see through puck optical window 114, but optical signals could transmit through it. In some embodiments, puck optical window 114 is an optically transparent material that includes a selectively transmissive coating. Similar to the selectively transmissive material, the selectively transmissive coating may be reflective of light in certain wavelengths while transparent to light in other wavelengths. The selectively transmissive coating may be a deposited coating or a laminated coating. In some embodiments, puck optical window 114 is an optically transparent window that is transparent to visual, IR, and ultraviolet light. In embodiments, the emitted light is ultraviolet light. However, one skilled in the art understands that light having any suitable wavelengths can be emitted as an optical signal.

The emitted light may be received by an electronic device, e.g., phone 104. In embodiments, phone 104 may include a glass window 116 and a second optical data transfer module 118. Second optical data transfer module 118 may be configured to detect the light emitted from first optical data transfer module 112 in external charging and data puck 102. Additionally, second optical data transfer module 118 may be configured to emit light to first optical data transfer module 112. Accordingly, data may transfer between external charging and data puck 102 and phone 104 in both directions. Similar to puck optical window 114, light may exit from and enter into phone 104 through glass window 116. In embodiments, glass window 116 is transparent to the light such that glass window 116 does not adversely affect the intensity of the light. Similar to puck optical window 114, glass window 116 may be formed of a selectively transmissive material, an optically transparent material including a selectively transmissive coating, or an optically transparent material. Glass window 116 may be shaped in a way that is aesthetically pleasing. For example, glass window 116 may be in the shape of a company's logo. Thus, glass window 116 may blend into the design of phone 104, thereby complementing its aesthetic design.

Successful optical data transfer may require highly accurate alignment between first and second optical data transfer modules 112 and 118. Any misalignment may lead to lower bandwidth data transfer rates. To achieve accurate alignment, first optical data transfer module 112 may include an active stage. The active stage may be an electrostatic stage that moves first optical data transfer module 112 upon application of an electric field. Accordingly, the active stage may be configured to perform fine movements in the X and Y directions of a horizontal plane (e.g., horizontally and perpendicularly to the cross-section shown in FIG. 1). In some embodiments, the active stage may also be configured to perform fine movements in the Z direction and in a rotational direction. The rotational direction may be around a vertical or a horizontal central axis of the active stage. The fine movements may allow active alignment between first and second optical data transfer modules. In some embodiments, second optical data transfer module 118 may also incorporate an active stage for performing active alignment. Accordingly, one or both of first and second optical data transfer modules 112 and 118 may move to achieve alignment with one another. By allowing the first and/or second optical data transfer modules 112 and 118 to move, highly accurate alignment may be achieved, thereby allowing maximum bandwidth for data transfer between the computer and phone 104 through external charging and data puck 102.

In embodiments, alignment mechanisms may be implemented to ensure that accurate alignment has been achieved. For example, light sensors 120 may be disposed around one of the first and/or second optical data transfer modules 112 and 118 to detect light. As shown in FIG. 1, the light sensors 120 may be disposed around second optical data transfer module 118. Light emitted from first optical data transfer module 112 may be directed toward second optical data transfer module 118. When light sensors 120 detect little to no emitted light, then it can be determined that first and second optical data transfer modules 112 and 118 are accurately aligned. In other embodiments, an array of optical channels may be implemented to ensure accurate alignment. A known alignment signal may be sent through one optic channel. When the alignment signal is detected, phone 104 and/or the computer may know whether the optical data transfer modules 112 and 118 are aligned by determining the strength and location of the detected signal.

In embodiments, first and second optical data transfer modules 112 and 118 may be laterally disposed within the inductive ring pair as shown in FIG. 1. In such embodiments, first and second optical data transfer modules 112 and 118 are disposed proximate to the inductive ring pair. Thus, when power is transferred between the inductive ring pair, strong, time-varying magnetic fields may be generated around first and second optical data transfer modules 112 and 118. The magnetic fields may negatively affect the electronics within first and second optical data transfer modules 112 and 118. In embodiments, a magnetic shielding may be used to minimize this negative effect. For instance, a metal cylindrical wall having a high magnetic permeability which also may or may not be electrically conductive may be disposed around first and second optical data transfer modules 112 and 118. The metal cylindrical wall may be formed of a material that includes nickel and iron such as mu-metal. It is to be appreciated that the time-vary magnetic fields may not affect the optical signals emitted between first and second optical transfer modules 112 and 118 because the optical signals may operate in a spectrum that is far away from the spectrum of the electromagnetic waves. In some embodiments, first and second optical data transfer modules 112 and 118 may be laterally disposed outside of the inductive ring pair. Being disposed outside of the inductive ring pair may decrease the negative effects of the magnetic field induced upon the electronics within first and second optical data transfer modules 112 and 118.

Figure 2:
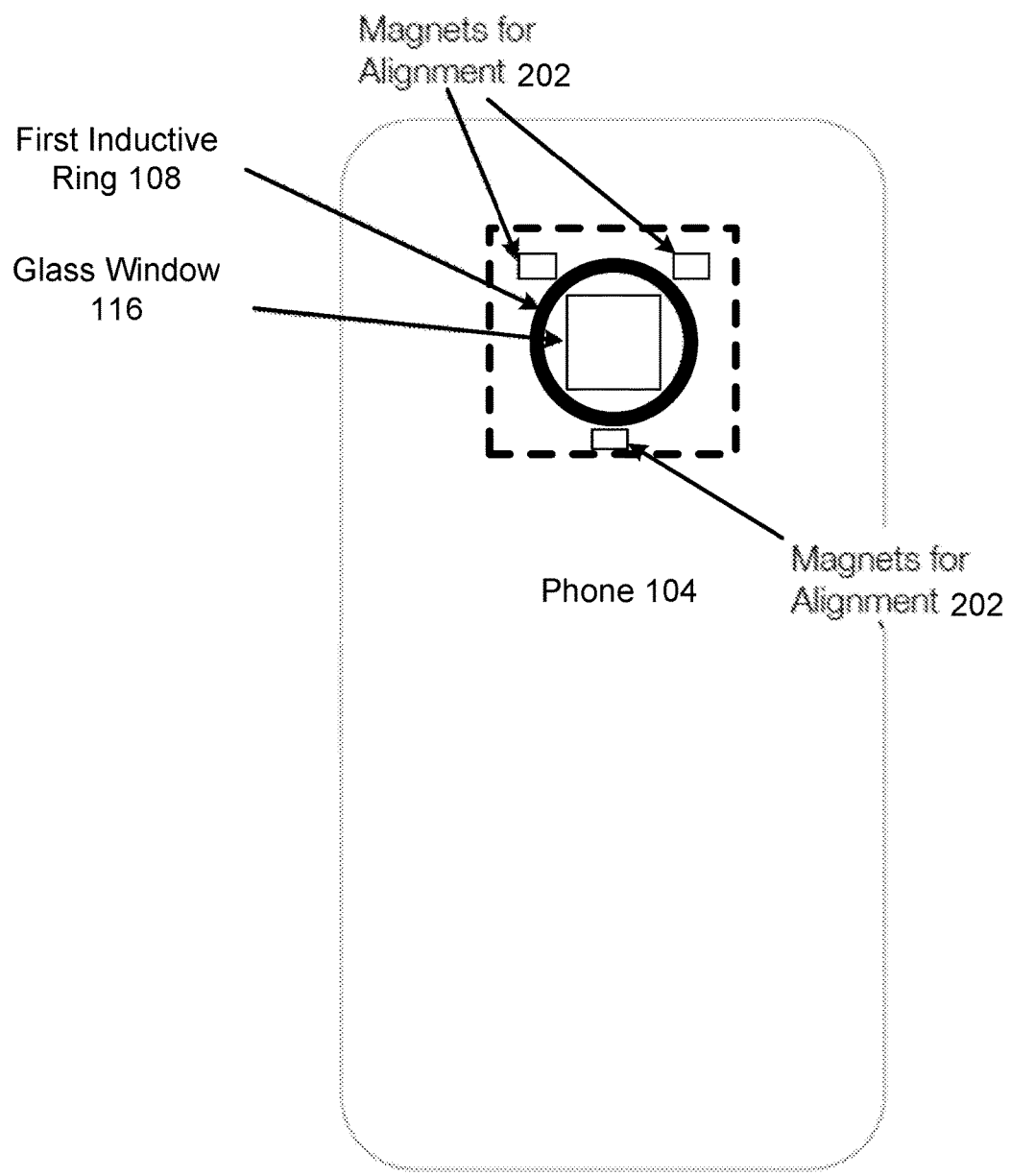
FIG. 2 illustrates a top-down view of a phone, according to certain embodiments of the present disclosure.

FIG. 2 illustrates a top-down view of a phone, such as phone 104, according to embodiments of the present disclosure. In embodiments, a plurality of alignment magnets 202 may be disposed around glass window 116 for rough alignment purposes. Alignment magnets 202 may help external charging and data puck 102 attach to the back surface of phone 104 and in a certain orientation. Once attached, one or both of first and second optical data transfer modules 112 and 118 may move to perform active alignment with one another while external charging and data puck 102 and phone 104 remain still. Thus, highly accurate alignment may be achieved between first and second optical data transfer modules 112 and 118 without having a user manually adjust the position of phone 104 for performing fine alignment.

As further shown in FIG. 2, glass window 116 may be disposed on a center axis of second inductive ring 110. Glass window 116 may be one or more logos that are formed into a back surface of phone 104. One skilled in the art understands that glass window 116 may be any shape desired to be formed. Second optical data transfer module 118 (not shown) may be disposed within phone 104 and below glass window 116. Although FIG. 2 shows one glass window 116, more than one glass window 116 may be included in the back surface of phone 104. Accordingly, embodiments may have more than one optical data transfer module 118 corresponding to the more than one glass window 116. As such, there may be more than one points of data transfer between phone 104 and external charging and data puck 102.

Disposing glass window 116 on the center axis of second inductive ring 110 may be an efficient use of the space provided around glass window 116. Accordingly, first and second optical data transfer modules 112 and 118 may be laterally disposed within first inductive ring 108. In embodiments, at least a portion of the back surface of phone 104 is magnetically permeable to allow magnetic fields to interact with second inductive ring 110.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments may be combined in any suitable manner without departing from the spirit and scope of embodiments of the disclosure.

Additionally, spatially relative terms, such as "bottom or "top" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. An apparatus comprising:
   a housing including a first exterior surface opposite a second exterior surface;
   an inductive coil disposed within the housing and positioned proximate the first exterior surface, wherein the coil has an inner diameter;
   an optically transparent window forming a portion of the first exterior surface of the housing and positioned within the inner diameter of the coil; and
   an optical data transfer module disposed within the housing and optically coupled to the optically transparent window, the optical data transfer module configured to perform bidirectional data transfer through the optically transparent window.

2. The apparatus of claim 1 wherein the optical data transfer module is a first optical data transfer module that is configured to automatically align with a second optical data transfer disposed outside of the housing by moving in a horizontal plane.

3. The apparatus of claim 2 wherein the second optical data transfer is configured to automatically align with the first optical data transfer module by moving in a horizontal plane.

4. The apparatus of claim 1 further comprising alignment magnets laterally disposed around the optically transparent window.

5. The apparatus of claim 1 wherein the optically transparent window is formed of a selectively transmissive material that is selectively transparent to at least one of infrared or ultraviolet light.

6. The apparatus of claim 1 wherein the optically transparent window includes a selectively transmissive coating, wherein the selectively transmissive coating is selectively transparent to at least one of infrared or ultraviolet light.

7. The apparatus of claim 1 further comprising a magnetic shield disposed around the optical data transfer module.

8. An electronic device comprising:
   a housing including an exterior mating surface configured to interface with a separate electronic device;
   an inductive coil disposed within the housing and positioned proximate the exterior mating surface, wherein the coil has an inner diameter;
   an optically transparent window forming a portion of the exterior mating surface and positioned within the inner diameter of the coil; and
   an optical data transfer module disposed within the housing and optically coupled to the optically transparent window such that bidirectional optical data signals can be sent from and received by the optical data transfer module.

9. The electronic device of claim 8 wherein the optical data transfer module is further configured to automatically align with the separate electronic device by moving in a horizontal plane.

10. The electronic device of claim 8 wherein the separate electronic device is configured to automatically align with the electronic device by moving in a horizontal plane.

11. The electronic device of claim 8 further comprising alignment magnets laterally disposed around the optically transparent window.

12. The electronic device of claim 8 wherein the optically transparent window is formed of a selectively transmissive material that is selectively transparent to at least one of infrared or ultraviolet light.

13. The electronic device of claim 8 wherein the optically transparent window includes a selectively transmissive coating, wherein the selectively transmissive coating is selectively transparent to at least one of infrared or ultraviolet light.

14. The electronic device of claim 8 further comprising a magnetic shield disposed around the optical data transfer module.

* * * * *